United States Patent
Kang et al.

(10) Patent No.: US 6,984,956 B2
(45) Date of Patent: Jan. 10, 2006

(54) METHOD OF DRIVING STEP MOTOR

(75) Inventors: Kyung-pyo Kang, Gyeonggi-do (KR); Hyoung-il Kim, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/270,659

(22) Filed: Oct. 16, 2002

(65) Prior Publication Data

US 2003/0141838 A1 Jul. 31, 2003

(30) Foreign Application Priority Data

Jan. 23, 2002 (KR) .................... 10-2002-0003865

(51) Int. Cl.
*H02P 8/22* (2006.01)
(52) U.S. Cl. .................................... 318/685
(58) Field of Classification Search ................ 318/685, 318/696
See application file for complete search history.

(56) References Cited

U.S. PATENT DOCUMENTS

| | | | | |
|---|---|---|---|---|
| 4,518,907 A | * | 5/1985 | Giguere | 318/696 |
| 4,941,608 A | * | 7/1990 | Shimizu et al. | 236/12.12 |
| 5,062,006 A | * | 10/1991 | Miura | 358/421 |
| 5,140,374 A | * | 8/1992 | Jagielski et al. | 399/144 |
| 5,378,975 A | * | 1/1995 | Schweid et al. | 318/685 |
| 5,780,853 A | * | 7/1998 | Mori et al. | 250/310 |
| 6,009,292 A | * | 12/1999 | Jinbo et al. | 399/208 |
| 6,118,963 A | * | 9/2000 | Fujikura et al. | 399/167 |
| 6,152,626 A | * | 11/2000 | Yanagi et al. | 400/279 |
| 6,166,510 A | * | 12/2000 | Higashi et al. | 318/685 |
| 6,502,913 B2 | * | 1/2003 | Ho et al. | 347/9 |
| 6,555,985 B1 | * | 4/2003 | Kawabata et al. | 318/685 |
| 6,642,687 B2 | * | 11/2003 | Aoshima | 318/696 |
| 6,713,985 B2 | * | 3/2004 | Aoshima | 318/696 |

FOREIGN PATENT DOCUMENTS

| | | |
|---|---|---|
| JP | 54-065320 | 5/1979 |
| JP | 63-265590 | 11/1988 |

\* cited by examiner

*Primary Examiner*—Bentsu Ro
(74) *Attorney, Agent, or Firm*—Staas & Halsey LLP

(57) ABSTRACT

A method of driving a step motor is provided which uses different operations of driving the step motor according to the driving speed of the driver, including a micro step operation for a low speed section of the driver and a full step operation for a high speed section of the driver. The method reduces low speed vibration and high speed noise caused by switching pulse noise. Moreover, driving the step motor by the full step operation in the high speed section reduces the frequency of use of a central processing unit (CPU), thereby stabilizing the driving device. In addition, only a small number of reduction gears is required, reducing the size of the driving device.

18 Claims, 5 Drawing Sheets

METHOD OF DRIVING STEP MOTOR

CROSS-REFERENCE TO RELATED APPLICATIONS

This application claims the benefit of Korean Application No. 2002-3865 filed Jan. 23, 2002 in the Korean Intellectual Property Office, the disclosure of which is incorporated herein by reference.

BACKGROUND OF THE INVENTION

1. Field of the Invention

The present invention relates to a method of driving a step motor, and more particularly, to a method of driving a step motor used in office equipment such as printers, photocopying machines, scanners, and facsimiles.

2. Description of the Related Art

A step motor rotates by a predetermined angle, namely a step angle, on application of one pulse. The step motor, with characteristics of high performance, small size, and light weight has been widely used as a core driving source, and demand has been increasing due to developments in mechatronics fields like factory automation (FA), office automation (OA), and precision industry. In particular, the step motor is widely used as the driving source for ink jet printers, scanners, facsimiles, and laser printers that require position control with high precision and low noise level in various speed ranges.

FIGS. 1 and 2 schematically illustrate an example of a conventional driving device using a step motor. Reference numerals 10, 12, 14 and 16 denote first through fourth reduction gears that transfer driving force from a step motor M to a feed roller D1. Reference character D2 denotes a compression roller that compresses a sheet 18 against the feed roller D1 to transfer the sheet 18 into the driving device.

In this case, the step motor M rotates by a predetermined step angle, so that the first reduction gear 10, which is connected to the shaft of the step motor M, is rotated by the same angle. The second reduction gear 12 engaged with the first reduction gear 10 is rotated by an angle corresponding to the amount of linear movement of the first reduction gear 10. The rotation of the second reduction gear 12 transferred to the third and fourth reduction gears 14 and 16 rotates the feed roller D1, so that the sheet 18 moves a distance corresponding to an angle of rotation of the feed roller D1. As a result, the sheet 18 moves the distance calculated by multiplying a gear ratio of the reduction gears 10, 12, 14, and 16 by a predetermined step angle of the step motor M. In this case, a number of teeth of the first reduction gear 10 is divided by a number of teeth of the second reduction gear 12, and a number of teeth of the third reduction gear 14 is divided by a number of teeth of the fourth reduction gear 16. Then, the respective results of the division are multiplied to obtain the gear ratio of the reduction gears 10, 12, 14, and 16. The gear ratio of the first through fourth reduction gears 10, 12, 14, and 16 is fixed, so that the distance of movement of the sheet 18 is determined by controlling the drive of the step motor M.

The step motor M is driven by a step motor driver (not shown) that supplies a predetermined driving current to each phase of the step motor M. In particular, a predetermined driving pulse driving the step motor M is applied from a step motor controller (not shown) to the step motor driver, so that the step motor driver applies the driving current to the step motor M. The step motor M receives the driving current for rotation through a predetermined angle. For example, when there are two current control bits for the step motor M, the step motor M rotates by one-fourth of a step angle, which is changed from one step angle, by controlling the current applied to a phase. In this case, since the step angle of the step motor M is reduced from one to one-fourth, the rotation speed of the step motor is decreased to one-fourth. Moreover, since the one-fourth step angle is formed by dividing the step angle into four, the movement of the sheet 18 at the one-fourth step angle is controlled to be four times more precise as compared to at the one step angle. However, when the step motor M is driven by the one-fourth step angle, the step motor M requires four times the step pulses as compared to at the one step angle to maintain the speed of the sheet 18. The amount of frequencies output from a switching pulse is increased by four times, and the operations related to ports that are performed by the controller like a microcomputer or a central processing unit (CPU), which controls the driving device, are increased by four times.

Accordingly, to obtain an output of high resolution using a conventional driving device with a step motor driven by one step angle, the reduction gear ratio has to be increased, so that a number of reduction gears is increased, thereby increasing a size of the driving device.

When the step motor is driven by 1/n step angle to improve driving speed and precision in position control, vibration noise is generated from the reduction gears when driven at high speed, and the switching pulse may exceed a clock limit of the CPU, since the switching pulse is increased by n times.

SUMMARY OF THE INVENTION

To solve the above-described problems, a method of driving a step motor is provided to reduce vibration in low speed driving, and noise and frequency of use of a central processing unit (CPU) in high speed driving, to precisely control the position of a moving body moved by a driving device, and to reduce the size of the driving device.

To accomplish an aspect of the present invention, a method of driving a step motor used as a driving source to driver a driver is provided. Here, different operations of driving the step motor are used according to the driving speed of the driver, including a micro step operation for a low speed section of the driver and a full step operation for a high speed section of the driver.

The step motor may drive a driving roller that moves a sheet onto which predetermined image information is transferred according to a transfer process of the image, a photosensitive drum on which a predetermined electrostatic latent image is formed corresponding to data or a document, or a driving roller driving a photosensitive belt on which the electrostatic latent image is formed. The step motor may be driven by a 1/16 step angle in the micro step operation.

To accomplish another aspect of the present invention, a method of driving a step motor comprises: driving the step motor by a first micro step operation until reaching a first full position; determining whether the step motor has reached the first full position; when the step motor has reached the first full position, driving the step motor by a full step operation; Whether the step motor has reached a last full position is determined while the step motor is driven by the full step operation. The step motor is driven by a second micro step operation when the step motor has reached the last full position, and the step motor is driven by the full step operation prior to reaching the last full position. Whether the step motor has reached a target position is determined while driving the step motor by the second micro step operation.

The rotation of the step motor is stopped when the step motor has reached the target position, and the step motor is driven by the second micro step operation prior to reaching the target position.

A further aspect of the present invention is a computer readable storage medium for storing a program to control a computer for driving a step motor at different speeds by executing: first micro step driving the step motor in a first micro step operation; second micro step driving the step motor in a second micro step operation; and full step driving the step motor in a first full step operation, the first full step operation occurring at a higher speed than either of the first or second micro step operations; and stopping the step motor after reaching a target position.

The step motor may be driven by a $1/16$ step angle in the first micro step operation.

According to the method of driving the step motor, switching pulse noise and vibration are remarkably reduced even when using an inexpensive step motor, and the size of the driving device is reduced by reducing the number of reduction gears. Moreover, the step motor is driven by full steps in high speed driving, so that the frequency of use of the CPU is reduced and system stability is enhanced.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
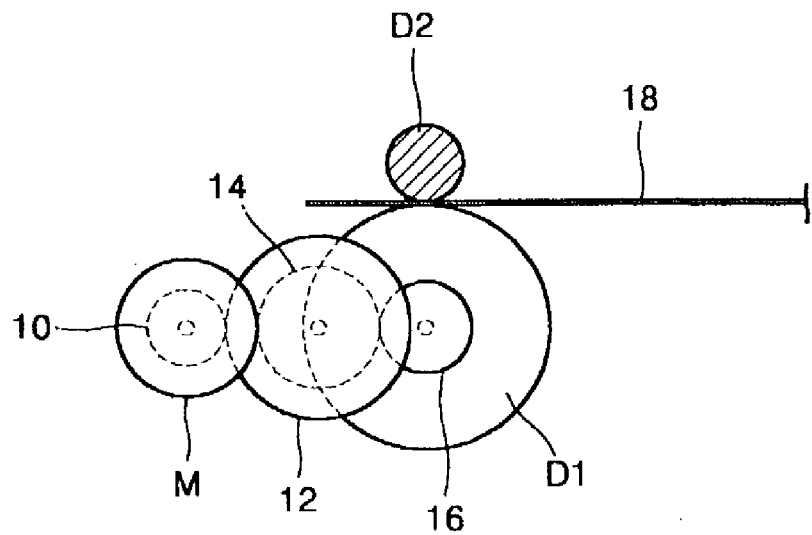
FIG. 1 is a schematic structural diagram illustrating a driving device driven by a conventional step motor.
Figure 2:
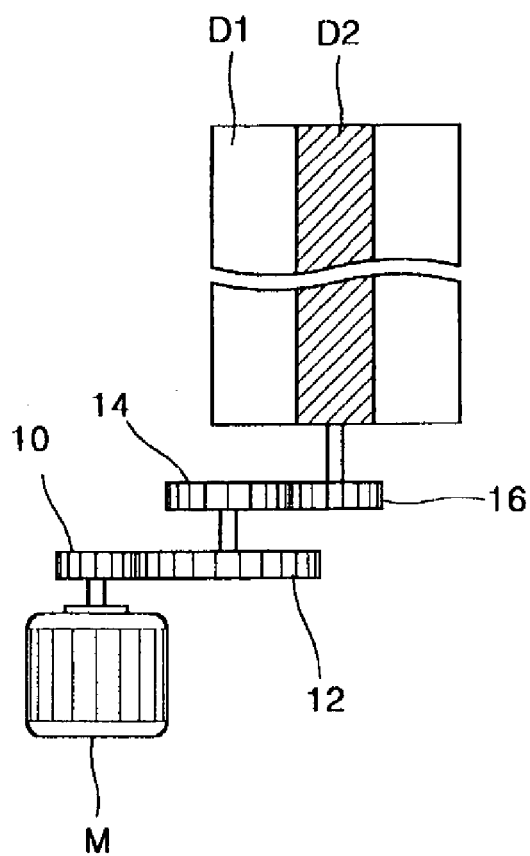
FIG. 2 is a plan view of the driving device of FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

In the drawings, some dimensions are exaggerated for clarity.

The structure of a driving device including a driver, which is driven by the step motor driven by the method of driving the step motor according to the present invention, will be briefly described.

Figure 3:
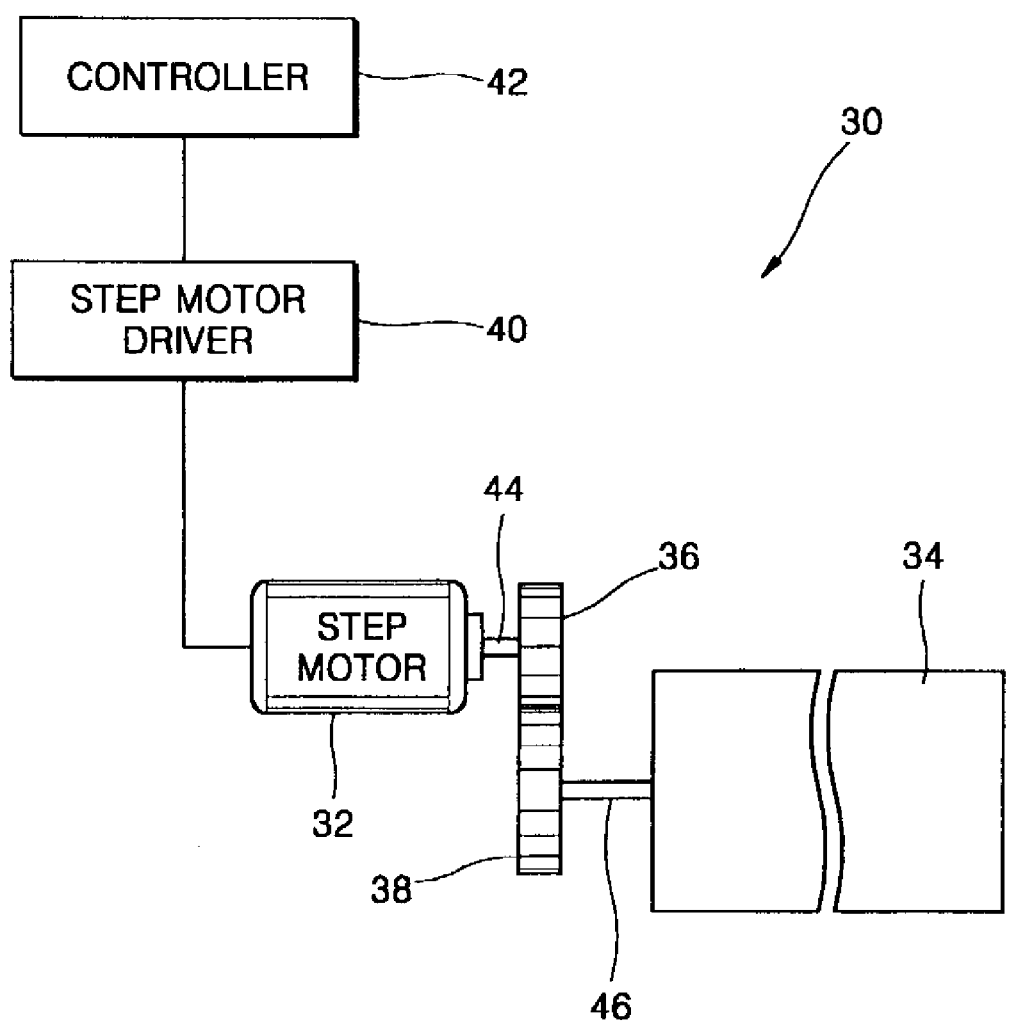
FIG. 3 is a structural diagram illustrating a driving device driven by a step motor according to an embodiment of the present invention.

Referring to FIG. 3, a driving device 30 comprises a step motor 32; a driver 34 driven by a rotating force transferred from the step motor 32; first and second reduction gears 36 and 38 arranged between the step motor 32 and the driver 34 transferring the rotating force from the step motor 32 to the driver 34; a step motor driver 40 receiving a predetermined pulse signal driving the step motor 32, dividing or amplifying the received pulse signal according to a number of phases of the step motor 32, and applying current to each winding of the step motor 32 according to a predetermined order to drive the step motor 32 by a predetermined driving operation (i.e., a full step operation or a micro step operation) and a controller 42 applying the pulse signal to the step motor driver 40 and controlling an operation speed, a rotating angle, and a rotating direction of the step motor 32.

In this case, the driver 34 is a driving roller or a photosensitive material, for example, a photosensitive drum. The driving roller moves a sheet, onto which image information is transferred, according to a transfer process, and a predetermined latent electrostatic image, corresponding to data input from external office equipment such as printers, scanners, facsimiles, or photocopying machines, is formed on a photosensitive drum. The driver 34 can be a driver roller that drives a photosensitive belt, which is one of the photosensitive materials. A drive shaft 44 coaxially connects the step motor 32 to the first reduction gear 36, and a drive shaft 46 coaxially connects the second reduction gear 38 to the driver 34.

The controller 42 may be a personal computer (PC) or a microcomputer and may includes memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs.

Further, the controller 42 may include a machine readable storage medium for storing a program to control a computer for driving a step motor at different speeds by executing: first micro step driving the step motor in a first micro step operation; second micro step driving the step motor in a second micro step operation; and full step driving the step motor in a first full step operation, the first full step operation occurring at a higher speed than either of the first or second micro step operations; and stopping the step motor after reaching a target position.

The step motor 32 may be a two-phase step motor, however step motors of other types may also be used. The operation of driving the step motor 32 is determined depending on a driving speed of the driver 34. For example, when the driver 34 is driven at low speed to precisely control a position of the sheet moved by the driver 34, the step motor 32 may be driven by the micro step operation rather than the full step operation or half step operation. When the driver 34 is driven at high speed, the step motor 32 may be driven by the full step operation. In the case of driving the step motor 32 by the micro step operation, the step motor 32 may be driven at a 1/n step angle, where n is 1 or more, preferably equal to or greater than four. However, the step motor 32 may also be driven at a $1/16$ step angle.

The method of driving the step motor 32 will be described with reference to FIG. 4.

Figure 4:
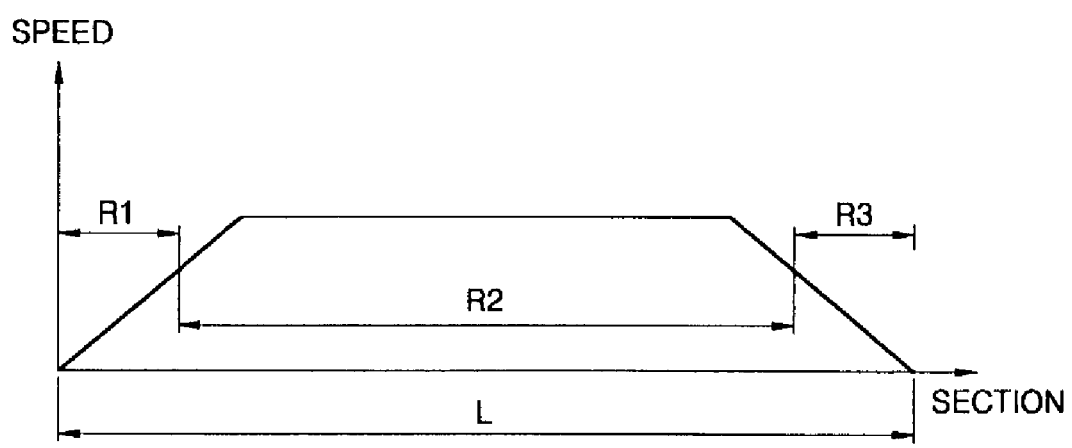
FIG. 4 illustrates the difference in method of driving the step motor between low and high speed sections of a driver shown in FIG. 3.

Referring to FIG. 4, a reference character L denotes the total movement distance of the sheet, and reference characters R1, R2, and R3 respectively denote a first section of movement at low speed, a section of movement at high speed, and a second section of movement at low speed. In this case, the first section will be referred to as a first low speed section, the section of high speed will be referred to as a high speed section, and the second section of low speed will be referred to as a second low speed section. The sheet is aligned to transfer a predetermined image to the sheet in the first low speed section R1, and after finishing the transfer of the predetermined image, the sheet is prepared to be discharged in the second low speed section R3. In order to precisely transfer the predetermined image to a predetermined position of the sheet, the sheet may be precisely aligned in the first and second low speed sections R1 and R3. Accordingly, the driver 34 may be driven at low speed in the low speed sections R1 and R3. Consequently, the step motor 32 is driven by the micro step operation, and, for example, may be rotated by 1/16 step angles in the first and second low speed sections R1 and R3.

Since the step motor 32 may rotate by the 1/16 step angle in the first and second low speed sections R1 and R3, the controller 42 and the step motor driver 40 must generate 16 times more driving pulses and switching pulses than when using a natural step angle of the step motor 32. However, the step motor 32 is driven at low speed, so a switching pulse does not exceed a clock limit of the CPU.

Since the position of the sheet is precisely controlled in the first and second low speed sections R1 and R3, the step motor 32 is driven at the natural step angle of the step motor 32 when starting the high speed section R2. Thus, the method of rotating the step motor 32 is changed from the micro step operation in which the step motor 32 is rotated at the 1/16 step angle into the full step operation in which the step motor 32 is rotated at the single step angle.

Since the step motor 32 is driven by the full step operation in the high speed section R2, the number of driving pulses generated by the controller 42 to produce one revolution of the step motor 32 is reduced. The merit may dwindle for a certain amount while driving the step motor 32 at high speed in the high speed section R2. However, in the high speed section R2 in which one driving pulse is generated for each step angle, the intervals between driving pulses are increased to 16 times the intervals in the first and second low speed sections R1 and R3 in which one driving pulse is generated for each 1/16 step angle. Further, a sufficient clock margin of the CPU in the controller is secured in the high speed section R2. As a result, the driving device is stably maintained while realizing high resolution. According to the rotation of the step motor 32 by one step angle in the high speed section R2, smooth driving of the step motor 32 is maintained while minimizing switching pulse noise. Therefore, the number of reduction gears can be lowered, reducing the size of the driving device 30.

Figure 5:
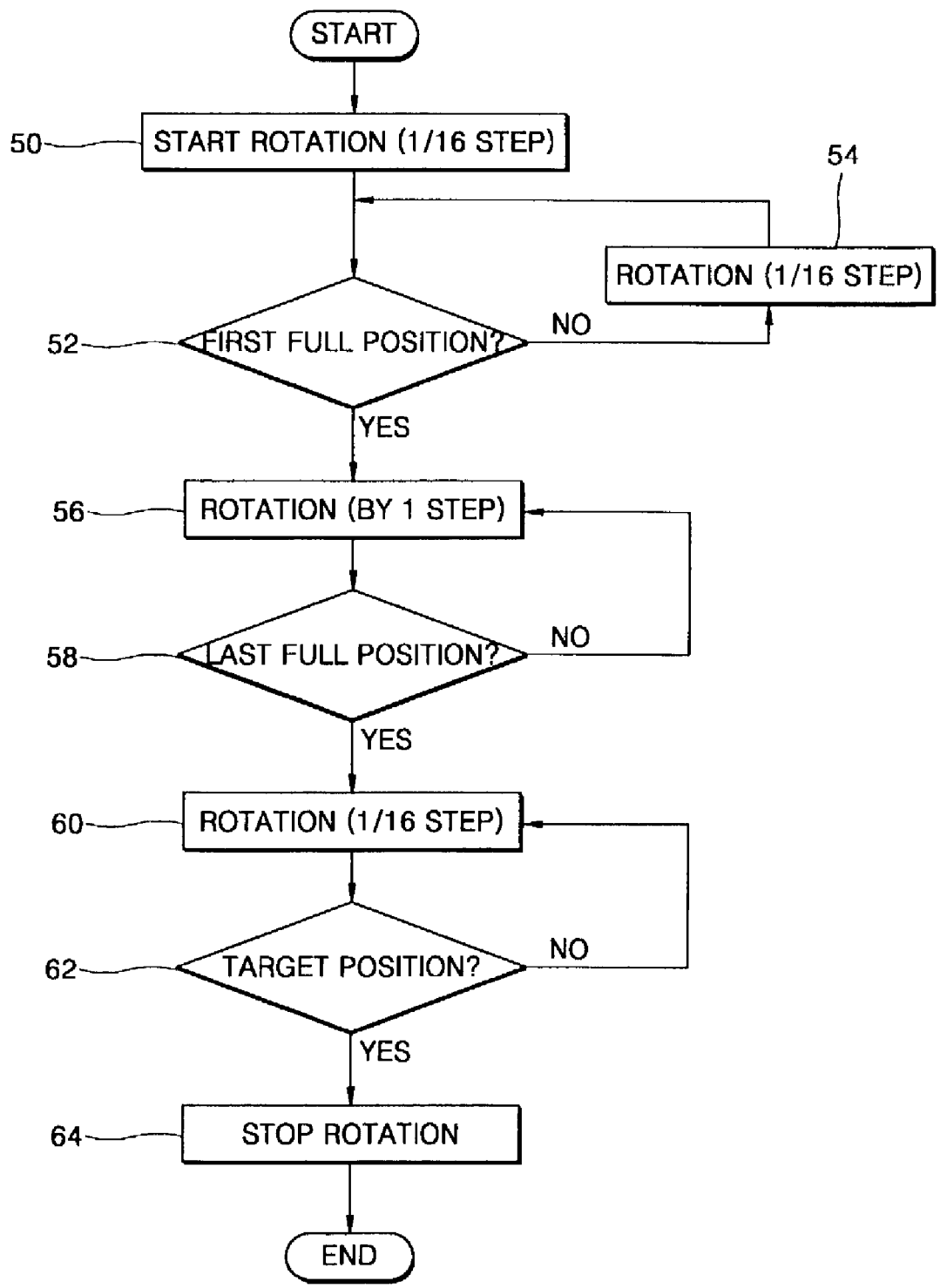
FIG. 5 is a flowchart illustrating the method of driving the step motor in the driving device shown in FIG. 3.

FIG. 5 is a flowchart illustrating the method of driving the step motor 32. Referring to FIG. 5, the step motor 32 is rotated by a first micro step operation in operation 50. In this case, the step motor 32 is rotated by the 1/16 step angle. According to the rotation of the step motor 32, the rotating force of the step motor 32 is transferred to the driver 34 through the first and second reduction gears 36 and 38 to rotate the driver 34.

Whether the step motor 32 has reached an initial full position is determined in operation 52.

The driver 34 is rotated by the driving force transferred from the step motor 32, or the sheet moved by the driver is moved a predetermined distance. Then, whether the rotated position of the driver or the new position of the sheet is a position to drive the step motor 32 by the full step operation is determined.

In the case that the step motor 32 does not reach the full position, the step motor 32 is continuously rotated by the first micro step operation in operation 54. In the case that the step motor 32 reaches the full position, the step motor 32 proceeds to operation 56. The step motor 32 is driven by the full step operation, namely rotated by the natural step angle of the step motor 32, in operation 56. The rotation of the step motor 32 is transferred to the driver 34 through the first and second reduction gears 36 and 38 to move the driver 34 and the sheet transferred by the driver 34 at high speed. The drive of the step motor 32 in operation 56 is continued until the step motor 32 reaches a last full position.

Whether the step motor 32 has reached the last full position is determined in operation 58.

Since the overall rotation angle of the driver 34 or the movement distance of the sheet moved by the driver 34 is recognized in the high speed section R2 in which the step motor 32 is driven by the full step operation, the number of revolutions of the step motor 32 can be reduced so that the driver 34 reaches a final rotation angle or the sheet moves a total distance.

Accordingly, whether an optional one step revolution of the step motor 32 is the last rotation by the full step operation in the high speed section R2 is determined.

When a determination is made that the step motor 32 has reached the last full position, the step motor 32 is rotated by a second micro step operation, in operation 60. In the second micro step operation, the step motor 32 is rotated by the 1/16 step angle.

When a determination is made that the step motor 32 has not reached the last full position, the step motor is continuously rotated by the natural step angle of the step motor 32.

Whether the driver 34 or the sheet has reached a target position, is determined in operation 62.

When the step motor 32 is rotated by the 1/16 step angle, the rotation speed of the driver 34 or the movement speed of the sheet, which is transferred by the driver 34, is decreased. Therefore, the driver 34 or the sheet reaches a target position, namely the rotation angle of the driver 34 or the movement distance of the sheet, at the decreased speed. When the driver 34 or the sheet has reached the target position, the rotation of the step motor 32 is stopped, in operation 64. Further, the rotation of the driver 34 and the movement of the sheet are stopped. When the driver 34 or the sheet has not reached the target position, the step motor 32 is continuously rotated by the 1/16 step angle.

Figure 6:
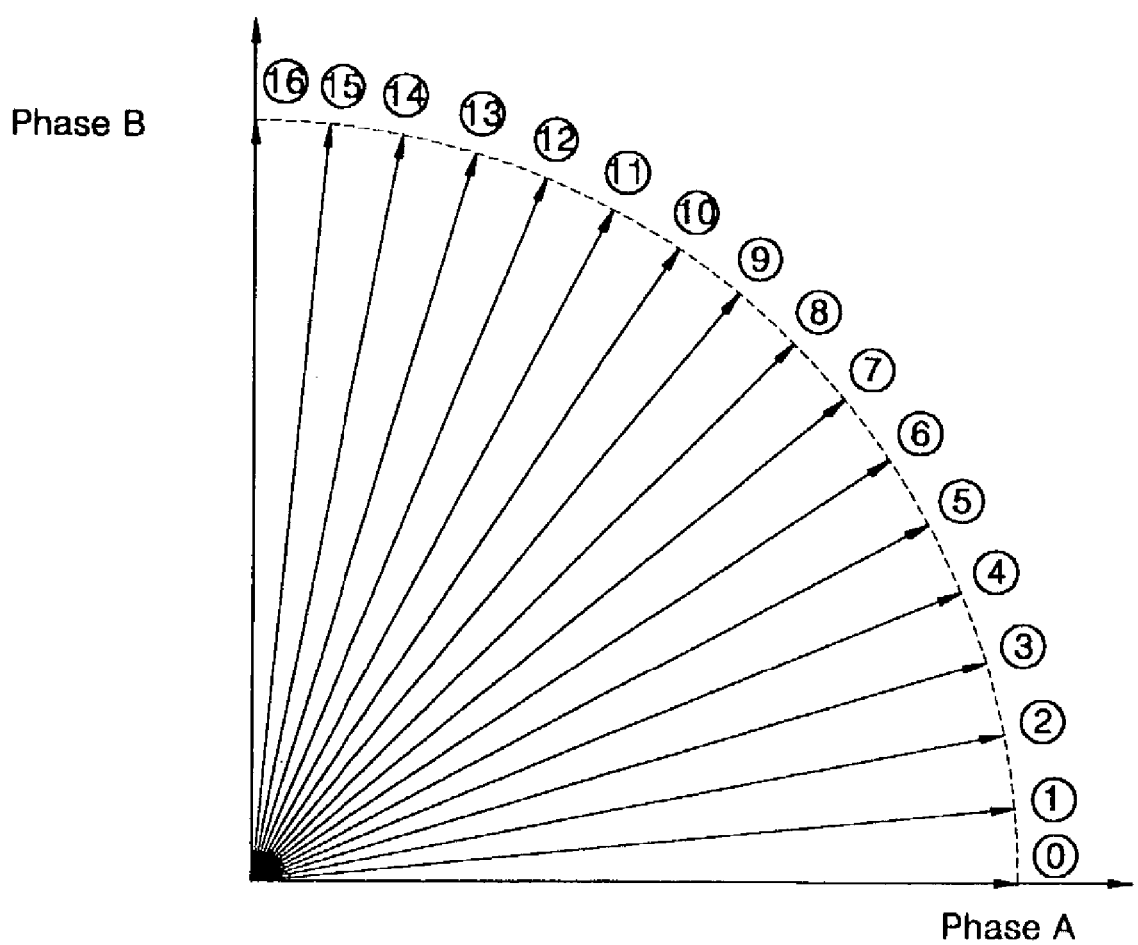
FIG. 6 is a torque vector diagram illustrating driving the step motor of the driving device shown in FIG. 3 by a 16-division micro step operation.

The method of driving the step motor according to the above embodiment of the present invention drives the step motor 32 by the micro step method in which the natural step angle of the step motor 32 is divided by 16, in the first and second low speed sections R1 and R3. FIG. 6 illustrates a torque vector diagram of the step motor 32 rotated by the micro step operation. Referring to FIG. 6, arrows having a same length denote torque vectors at each divided step angle, and circled numbers located at the ends of each torque vector denote positions at which the step motor 32 can be stopped by the step motor driver 40. In this case, the positions are the full positions at which the step motor 32 can be stopped within each step angle. According to FIG. 6, the step motor 32 stops and starts 16 times in one natural step angle of the step motor 32.

The method of driving the step motor shown in FIG. 5 will be described with reference to FIG. 6. It is presumed that the step motor 32 is presently located at ②, and will be stopped at ② after driving at high speed for n steps. The start position of the step motor 32 is computed by subtracting the present position from the first full position of the step motor 32, which is presumed to be ⑧. The start position is subtracted from the overall rotating amount, and then the subtracted result is divided by 16. The remainder of the division is determined to be the stop position of the step motor 32. After the start and stop positions are determined, the step motor 32 is driven.

According to the method of driving the step motor 32 as shown in FIG. 5, the step motor 32 is driven by the 1/16 step angle by the micro step operation for the section between ② and ⑧, corresponding to the first low speed section R1 of FIG. 4. When the rotating position of the step motor 32 reaches the first full position ⑧, the step motor 32 is driven by the full step angle by the full step operation for n steps for the first high speed section R2 of FIG. 4. Right after the step motor 32 rotates the nth full step angle, the step motor 32 rotates by the 1/16 step angle until the position ②, namely, for the second low speed section R3 of FIG. 4. Then, the step motor 32 is stopped.

Table 1 describes a case where n is zero, namely the full step drive of the step motor 32 is absent. The Table 1 illustrates the start positions when the present positions are 1 through 16, and the stop positions when the target positions are 1 through 16.

TABLE 1

| present position | target position | start position | stop position |
|---|---|---|---|
| 16 | 1 | 16 | 1 |
|  | 2 |  | 2 |
|  | . |  | . |
|  | 16 |  | 16 |
| 15 | 1 | 1 | 1 |
|  | 2 |  | 2 |
|  | . |  | . |
|  | 16 |  | 16 |
| . |  |  |  |
| . |  |  |  |
| 1 | 1 | 15 | 1 |
|  | 2 |  | 2 |
|  | . |  | . |
|  | 16 |  | 16 |

The number 1 through 16 in the present position column denote the divided positions when one step angle is divided into 16. Accordingly, the numbers 1 through 16 are the same as the circled numbers in FIG. 6. The start positions in Table 1 are computed by subtracting the present positions from the first full position, which is presumed to be 16. The number 1 in the target position column denotes the position where the step motor 32 is rotated by the 1/16 step angle for 17 steps, and the number 2 denotes the position where the step motor 32 is rotated for 18 steps. Accordingly, the number 16 in the present position column implies the rotation of the step motor 32 by the 1/16 step angle for 16 steps. Therefore, the step motor 32 reaches the target position 1 by rotating one step by the 1/16 step angle.

While this invention has been particularly shown and described with reference to preferred a embodiment thereof, this is merely illustrative and is not intended to limit the scope of the invention. It will be understood by those skilled in the art that the present invention may be applied to a variable reluctance (VR) step motor, a permanent magnet (PM) step motor, or a hybrid step motor, and the step motor may be driven by a step operation between the micro and full step operations. Accordingly, the scope of the present invention will be defined by the appended claims.

As described above, the method of driving the step motor according to the preferred embodiment of the present invention drives the step motor by the micro step operation in the low speed sections, and by the full step operation in the high speed section. According to driving the step motor by different operations depending on the driving sections, the position of the driver driven by the step motor can be precisely controlled even when using an inexpensive step motor. Moreover, applying the full step method to the high speed section minimizes noise caused by excessive switching pulses while securing sufficient clock margin of the CPU. In addition, since the step motor is driven by the 1/16 step angle in the low speed sections, a separate reduction gear is not required. As a result, the present invention allows a driving device to be very small.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of driving a step motor used as a driving source for driving a driving roller to move a sheet onto which predetermined image information is transferred according to a transfer process, or to drive a photosensitive belt, different operations of driving the step motor being used according to a driving speed of the driving roller, the method comprising:
   a micro step operations for corresponding low speed sections to drive the driving roller respectively at first and third positions of the sheet; and
   a full step operation for a high speed section to drive the driving roller at a second position of the sheet, between the first and third positions.

2. The method of driving the step motor of claim 1, wherein the step motor is driven by a 1/16 step angle in the micro step operation.

3. A method of driving a step motor for driving a driving roller to move a sheet onto which predetermined image information is transferred according to a transfer process, or to drive a photosensitive belt, the method comprising:
   driving the step motor by a first micro step operation to drive the driving roller;
   determining whether the step motor has reached a first full position corresponding to a first position of the sheet;
   driving the step motor by a full step operation to drive the driving roller after determining that the step motor has reached the first full position, and driving the step motor by the first micro step operation when the step motor has not reached the first full position;
   determining whether the step motor has reached a last full position corresponding to a second position of the sheet while driving by the full step operation;
   driving the step motor by a second micro step operation to drive the driving roller after determining that the step motor has reached the last full position, and driving the step motor by the full step operation when the step motor has not reached the last full position;
   determining whether the step motor has reached a target position while driving by the second micro step operation; and
   stopping a rotation of the step motor after determining that the step motor has reached the target position, and driving the step motor by the second micro step operation after determining that the step motor has not reached the target position.

4. The method of driving the step motor of claim 3, wherein the step motor is driven by a 1/16 step angle in the first micro step operation.

5. The method of driving the step motor of claim 3, wherein the step motor is driven by a 1/16 step angle in the second micro step operation.

6. The method of driving the step motor of claim 3, wherein the step motor is driven by a 1/n step angle, where n is equal to or greater than 4, in the first micro step operation.

7. The method of driving the step motor of claim 3, wherein the step motor is driven by a 1/n step angle, where n is equal to or greater than 4, in the second micro step operation.

8. The method of driving the step motor of claim 3, wherein each of said driving the step motor operations comprises driving a driving roller to move the sheet onto which predetermined image information is transferred according to a transfer process of an image by forming a predetermined electrostatic latent image corresponding to data or a document on a photosensitive drum, or driving the driving roller to drive a photosensitive belt.

9. A method of driving a step motor used as a driving source for driving a driving roller to move a sheet onto which predetermined image information is transferred according to a transfer process, or to drive a photosensitive belt at different speeds, the method comprising:
   first micro step driving the step motor in a first micro step operation to drive the driving roller;
   second micro step driving the step motor in a second micro step operation to drive the driving roller;
   full step driving the step motor in a first full step operation to drive the driving roller, the first full step operation occurring at a higher speed than either of the first or second micro step operations and corresponding to a total movement distance of the sheet; and
   stopping the step motor after reaching a target position.

10. The method of driving the step motor of claim 9, wherein:
   said first micro step driving occurs initially;
   said full step driving is based on reaching a first full position; and
   said second micro step driving is based on reaching a last full position.

11. A method of driving a step motor for driving a driving roller to move a sheet onto which predetermined image information is transferred according to a transfer process, or to drive a photosensitive belt, the method comprising:
   driving the step motor by a first micro step operation to drive the driving roller prior to reaching a first total movement distance of the sheet;
   driving the step motor by a full step method to drive the driving roller after reaching the first total movement distance of the sheet;
   driving the step motor by a second micro step operation to drive the driving roller after reaching a last total movement distance of the sheet; and
   stopping a rotation of the step motor after reaching a target position of the step motor.

12. The method of driving the step motor of claim 11, wherein the step motor is driven by a 1/n step angle, where n is equal to or greater than 4, in the first micro step operation.

13. The method of driving the step motor of claim 11, wherein the step motor is driven by a 1/n step angle, where n is equal to or greater than 4, in the second micro step operation.

14. A method of driving a step motor, comprising:
   driving the step motor at least at two different speeds by varying the driving method by driving the step motor at different step angles of 1/n, where n is equal to or greater than 4,
   wherein driving the step motor comprises driving a driving roller to move a sheet to transfer a predetermined image to the sheet,
   the driving comprising:
   driving at the respective speed according to a position of the sheet,
   wherein the step motor is driven at three different speeds using three different step angles.

15. The method of driving the step motor of claim 14, wherein the step motor is driven in a middle interval at the high speed in either a first interval or a last interval, and the middle interval is a time period between the first and last intervals.

16. The method of driving the step motor of claim 15, wherein the step motor is driven at a same speed in the first and last intervals.

17. A method of driving a step motor to drive a driving roller to move a sheet to transfer a predetermined image to the sheet, the method comprising:
   driving the step motor to drive the driving roller according to a duration and/or a number of current pulses to a phase of the step motor;
   changing the duration and/or the number of current pulses when the step motor has reached each of a first full position and a last full position; and
   stopping a rotation of the step motor when the step motor has reached a target position of the sheet,
   wherein the driving comprises driving according to a greater number of the current pulses before the first full position and after the last full position, and the first full position and the last full position are between a top and a bottom end of the sheet.

18. A machine readable storage medium for storing a program to control a computer for driving a step motor at different speeds to drive a driving roller to move a sheet to transfer a predetermined image to the sheet by:
   first micro step driving the step motor in a first micro step operation to drive the driving roller;
   second micro step driving the step motor in a second micro step operation to drive the driving roller;
   full step driving the step motor in a first full step operation to drive the driving roller, the first full step operation occurring at a higher speed than either of the first or second micro step operations; and
   stopping the step motor after reaching a target position of the sheet.

* * * * *